July 20, 1937.  F. A. SEEDLOCK  2,087,483

FILE

Filed April 24, 1936

INVENTOR.
Frank A. Seedlock,
BY Hull, Brook & West,
ATTORNEYS

Patented July 20, 1937

2,087,483

UNITED STATES PATENT OFFICE 2,087,483

FILE

Frank A. Seedlock, Lakewood, Ohio, assignor to The Nolvex File Company, Cleveland, Ohio, a corporation of Ohio Application April 24, 1936, Serial No. 76,248

2 Claims. (Cl. 29—78)

This invention relates to improvement in files and has for its object to provide an improved form of tooth and land especially adapted for files having flat working surfaces and preferably for files of this type wherein the teeth are in the form of concentric segments or arcs the centers of which coincide with the axis of the files. Files of the type referred to are well known and have gone into extensive use. However, when files of this character have been used for the purpose of removing excess soft metal, such as solder, from the joints between metal plates which have been united by such soft metals, the grooves or lands between the teeth soon become clogged, making it necessary for the workman to employ another file and to remove the metal from the grooves or lands of the file which have become thus clogged in operation.

The object of my invention is so to construct a file of the general character referred to as to render it self-clearing when used in connection with soft metal.

Figure 1:
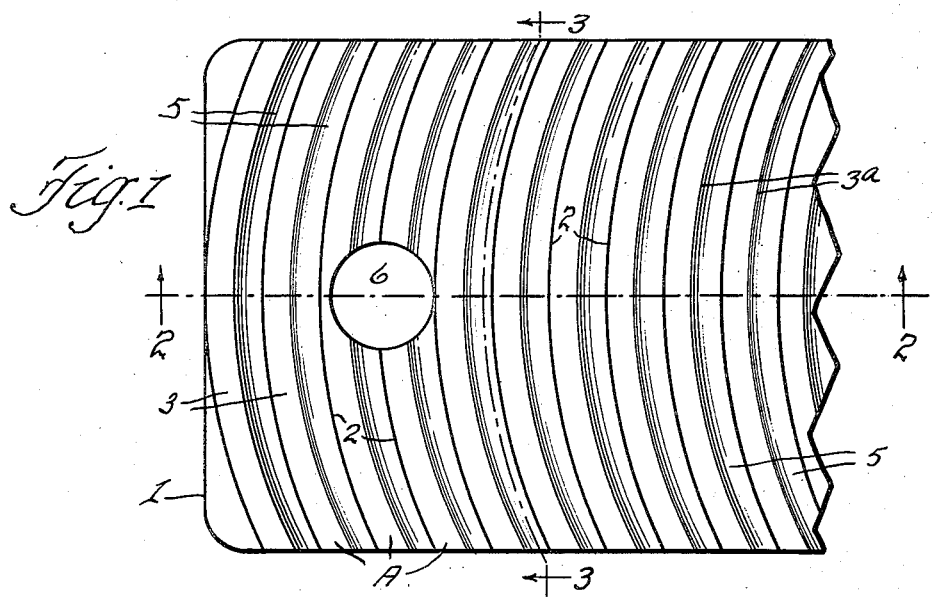
Figure 2:
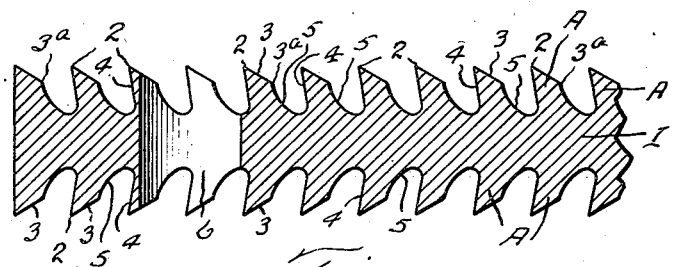
Figure 3:
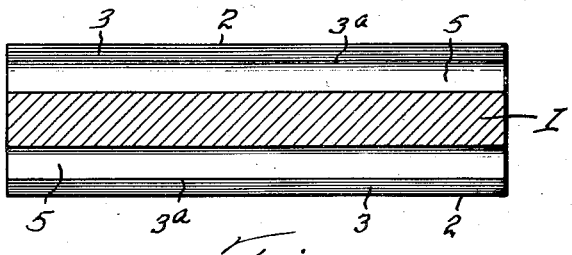

I accomplish the foregoing object by the construction illustrated in the drawing, wherein Fig. 1 represents a plan view of a portion of a file constructed in accordance with my invention; Fig. 2 a detail in section corresponding to the line 2—2 of Fig. 1; and Fig. 3 a detail in section corresponding to the line 3—3 of Fig. 1.

Describing by reference characters the parts shown in the drawing, I denotes the body of the file, the same being shown as one of the "flat" type having its opposite faces provided with teeth. Each tooth, indicated generally at A, is provided with a cutting edge 2, the cutting edges of the teeth being in the form of arcs or segments extending entirely across the working faces of the file, the radii of the cutting edges being equal and the centers coincident with the axis of the file. At the rear of the cutting edge, each tooth is provided with a relief face 3 sloping rearwardly toward the center of the file body. Each tooth is also provided with a front rake face 4 extending toward the body of the file and forming one of the boundaries of the land between such tooth and the tooth next in front thereof. The face 4 may have a rake of approximately 5°.

Files of the type illustrated herein as usually constructed have their lands or grooves formed by extending the relief faces 3 to the bottoms of the rake faces 4. When thus constructed and when operating on soft metal of the character described, the lands become filled with the soft metal, rendering the files temporarily inoperative. In order to overcome this objection I have formed the lands as follows:—Each relief face 3 extends rearwardly a distance preferably less than half the distance between the cutting edge 2 of one tooth and the bottom of the face 4 of the tooth at the rear thereof. The rear edge $3^a$ of each relief face 3 is connected with the bottom of the rake face 4 of the tooth adjacent to and at the rear thereof by an outwardly concave surface 5. By so changing the shape of the resultant lands and providing the extended concave surfaces 5, I am enabled to overcome the objections noted against the use of the ordinary files when operating on soft metal. Where files are constructed in accordance with my invention, the soft or semi-hard metal can roll along the concave surfaces 5 without adhering thereto, and the files are self-clearing.

The file may be provided at each end with an aperture 6 for the application thereto of a removable handle.

Having thus described my invention, what I claim is:

1. A file comprising a body having teeth extending continuously thereacross, each tooth having a forward cutting edge, a rake face extending toward the body from such cutting edge and forming one wall of a land, a relief face extending rearwardly and toward the body from such cutting edge, and an outwardly concave wall extending from said relief face approximately to and merging with the outwardly concave bottom of the groove between said tooth and the rake face of the next tooth at the rear thereof and completing the groove or land between said teeth, the relief faces of said teeth being fixed and uniform in width.

2. A file comprising a body having teeth extending thereacross, each tooth having a forward cutting edge in the shape of an arc, the arcs being concentric and having their centers on the axis of the body, each of said teeth also having a rake face extending toward the body from its cutting edge to form one of the walls of a land and each tooth also having a relatively short relief face extending rearwardly and toward the body from such cutting edge and a relatively long outwardly concave wall extending from the rear of each relief face to and merging with the outwardly concave bottom of the groove or land between the said tooth and the rake face of the next tooth at the rear thereof thereby to complete the groove or land between said teeth, the relief faces of said teeth being fixed and uniform in width.

FRANK A. SEEDLOCK.